United States Patent [19]

Seitz

[11] 4,335,958
[45] Jun. 22, 1982

[54] METHOD OF COPYING PICTURES FROM A TRANSPARENT CARRIER TO A SENSITIVE PAPER AND DEVICE FOR ITS EXECUTION

[75] Inventor: Hermann Seitz, Dietlikon, Switzerland

[73] Assignee: Createchnic Patent AG, Dietlikon, Switzerland

[21] Appl. No.: 205,753

[22] Filed: Nov. 10, 1980

[30] Foreign Application Priority Data

Dec. 14, 1979 [CH] Switzerland .................. 11074/79

[51] Int. Cl.³ .............................................. G03B 27/48
[52] U.S. Cl. ................................................. 355/48
[58] Field of Search ..................... 355/47, 48, 72, 75

[56] References Cited

U.S. PATENT DOCUMENTS 2,198,627  4/1940  Loughridge et al. ............... 355/47
2,444,785  7/1948  Rackett ............................. 355/48

FOREIGN PATENT DOCUMENTS 758260  8/1953  Fed. Rep. of Germany ........ 355/48
473397  7/1969  Switzerland .
503292  3/1971  Switzerland .
514864  12/1971  Switzerland .
527452  11/1972  Switzerland .
601835  7/1978  Switzerland .

OTHER PUBLICATIONS

European Patent Application No. 78300105.0, published under publication No. 0000286, Bruning, Western Electric Company, Inc., 1-10-79.
German Patent Publication No. 2,619,447, 5-3-76, Rank Xerox Limited.

Primary Examiner—L. T. Hix
Assistant Examiner—Alan Mathews
Attorney, Agent, or Firm—Werner W. Kleeman

[57] ABSTRACT

By means of two cylinders each composed of two interconnected discs, and which cylinders are rotatable in synchronism about a common axis and respectively transport along portions of their circumference an image carrier and a copy carrier, such carriers are continuously forwardly moved at identical angular velocities. A light source projects the negative located at the image carrier through an objective arranged at the common axis upon the copy carrier. The magnification and ratio reduction ratio is proportional to the ratio of the diameters of both cylinders. The light beam which passes through a slotted diaphragm projects continuously and in a strip-shaped configuration the negative from the image carrier to the copy carrier with constant opposite sense movement of such image and copy carriers.

8 Claims, 2 Drawing Figures

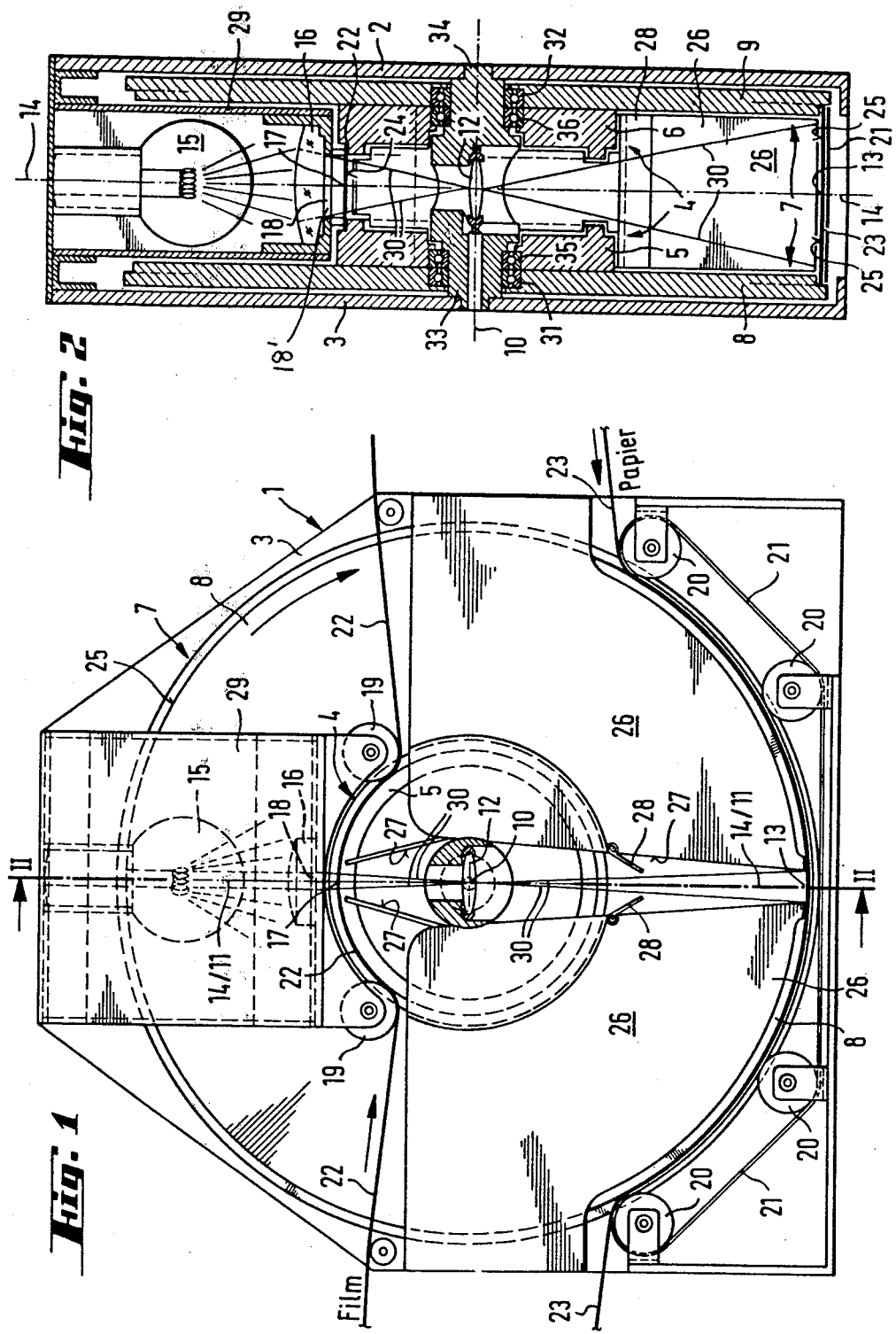

METHOD OF COPYING PICTURES FROM A TRANSPARENT CARRIER TO A SENSITIVE PAPER AND DEVICE FOR ITS EXECUTION

BACKGROUND OF THE INVENTION

The present invention relates to a new and improved method of, an apparatus for, copying images or pictures from a transparent image carrier on to a light sensitive copy carrier, typically light-sensitive paper.

Generally speaking, in accordance with the method of the invention a light beam emanating from a light source is projected through the transparent image carrier and an objective on to the light sensitive copy carrier located at the focal point of the objective. Both the part of the image carrier and the part of the copy carrier, impinged during the copying process by the light beam, are located upon co-axial cylinder segments and are moved. The objective is stationarily arranged at a common axis of the cylinder segments.

As to the apparatus for performance of the aforesaid method the same contains two co-axial cylinders at whose common axis of rotation there is located an objective. The image carrier and copy carrier bear at least partially upon segments of the cylinders, and both of these cylinders are rotatable. A light source is arranged so that it projects a light beam through the image carrier and the objective on to the copy carrier.

For the purpose of rationally copying, particularly photo negatives in strip-shaped configuration on to photo sensitive paper, there are required extremely rapidly operating copying processes and copying equipment. Such processes and equipment have been known for quite some time as have also been various magnification and scanning techniques of the article which is to be copied in the copying device.

According to a number of different heretofore known methods and apparatuses, such as for instance described in Swiss Pat. No. 514,864 of Xerox Corporation, the stationary image or picture carrier is projected upon a moved copy carrier by means of a moved light source and moved objective, wherein at times the copy carrier can be strip-shaped as, for instance, disclosed in Swiss Pat. No. 473,397 of General Aniline & Film Corporation.

Furthermore, apparatuses have become known to the art from Swiss Pat. No. 527,452 of International Business Machines Corporation wherein the image carrier located upon a cylinder segment is projected by means of a light beam from a stationary light source by means of an at least partially rotating mirror and an objective on to a moved copy carrier.

Moreover, there are also known quite complex and complicated methods and apparatuses wherein the image is projected from an image carrier, by means of a completely movable mirror system, on to a movable copy carrier, as such has for instance been disclosed in Swiss Pat. No. 503,292 of International Business Machines Corporation.

Additionally, apparatuses are known from German Patent Publication No. 2,619,447 of Rank Xerox Limited, wherein an image carrier guided over mirrors and an objective, by means of a cylindrical segment-shaped transparent support, is likewise projected on to a moved copy carrier.

Also in Swiss Pat. No. 601,835 there is disclosed an apparatus for projecting a film picture or image. Here, the image carrier and the copy carrier are arranged upon co-axial cylinder segments and the image is projected on to the copy carrier bearing upon the inner cylinder, and, if necessary, the light beam is guided by means of a likewise co-axial cylinder segment-shaped mirror and an objective located at the common axis.

Additionally, there is known from European Patent Application No. 78300105.0, published under publication No. 0000286 of Western Electric Company Incl., a method and apparatus wherein the image carrier and copy carrier are each respectively located upon a rotating cylinder. The image is continuously projected in a strip-shaped fashion from the image carrier on to the copy carrier by means of a fixed mirror and objective system arranged between the cylinders.

Each of the presently known copying methods and all of the equipment serving for the practice thereof possess disadvantages which, in part, appreciably effect the copying speed and complexity of the required equipment controls. Furthermore, as a rule, they also require complicated constructions of the copying equipment.

Thus, for instance, the control of the movement of a light source, but equally the control of the movement of an objective, as a function of the movement of the image carrier or copy carrier is technically extremely complicated. Even more complicated is the control of the movement of the mirrors or reflectors which must deflect the projection beam from the image carrier on to the copy carrier. Additionally, the projection of a flat or planar image upon a curved copy surface constitutes an optically complicated task. Moreover, each stepwise functioning method or each discontinuous work step automatically negatively affects the operating speed of the method and the equipment. Furthermore, such procedures require additional and complicated controls and mechanisms.

SUMMARY OF THE INVENTION

Therefore, it is a primary object of the present invention to provide a new and improved method of, and apparatus for, copying images or pictures from a transparent carrier on to a light-sensitive copy carrier in a manner not associated with the aforementioned drawbacks and limitations of the prior art proposals.

Another and more specific object of the present invention aims at providing a new and improved construction of a method and apparatus for copying images from a transparent image carrier to a light-sensitive copy carrier, wherein there is rendered possible maximum copying speed with a minimum of expenditure in control and mechanical equipment and while realising an extremely good quality of the copied pictures or images.

A further object of the invention is to provide a continuously operating copying method wherein there are avoided to the extent possible all discontinuous movements.

A further object is to devise a method of, and apparatus for, copying images from a transparent carrier on to a light-sensitive copy carrier, wherein it is possible to operatively correlate without any problems such method and apparatus with all presently available conventional auxiliary devices and methods which are concerned with the actual copying operation, such as, for instance, the use of color correction filters, special diaphragms, illumination value correction devices and so forth.

A further object of the invention is to provide a method and apparatus of the type described which is designed such that it can be employed in a semi or fully automatic film copy device.

A further significant object of the invention is to provide a copier which is designed such that it is extremely reliable in operation, has increased longevity, is easy to service, and furthermore, also should render possible the processing of extremely long image and copy carrier rolls.

Now according to the invention these objects and others, which will become more readily apparent as the description proceeds, is accomplished in that there is taught a method of the previously mentioned type wherein both the image carrier and also the copy carrier are guided with a continuous and the same angular velocity upon axial oppositely located cylinder segments rotating in the same direction, but while such carriers are moving in opposite sense through the light beam, such that the ratio between the radii of the cylinder segments respectively corresponds to the magnification and size reduction ratio or factor, of the copy upon the copy carrier in relation to the image upon the image carrier. Further, the image carrier and the copy carrier intersect the light beam, which is covered so as to form a strip, along a common diameter which extends through the axis of the cylinder segments.

As already mentioned previously the invention is not only concerned with the aforementioned method aspects but also relates to a new and improved construction of apparatus of the previously mentioned type for the performance of such method. The copier apparatus of the present development contemplates that both of the co-axial cylinders are fixedly coupled with one another during the copying operation so that they have the same rotational speed. There are also provided means by means of which it is possible to transport free of slip the image carrier upon the one cylinder over a predetermined cylinder segment and the copy carrier upon the other cylinder over a predetermined cylinder segment. Furthermore, along the optical axis of the objective located at the center of the cylinder, the cylinders are structured to be at least slot-shaped transparent, independent of their rotational position, in a manner such that the light beam can permanently fall along a diameter of the cylinders through the inner cylinder on to the copy carrier guided at the outer cylinder.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 schematically illustrates in top plan view an exemplary embodiment of copier apparatus according to the invention with the cover member and upper disc removed; and FIG. 2 is a cross-sectional view of the copier apparatus of FIG. 1, taken through the center of such copier apparatus along the line II—II of FIG. 1, wherein the upper disc and the cover are shown in their mounted condition.

DETAILED DESCRIPTION OF THE PREFERRED EMBODIMENTS

Describing now the drawings, there will be recognized that, on the one hand, an inner small cylinder 4, which advantageously consists of two co-axial fixedly intercoupled small discs or plates 5 and 6, is arranged within a housing 1 having a cover 2 and floor plate 3 and, on the other hand, an outer large cylinder 7, which advantageously consists of two co-axial fixedly intercoupled large discs or plates 8 and 9 likewise is arranged with the housing 1. Both of the cylinders 4 and 7 are co-axially arranged and rotatable about a common axis 10. At this axis 10 there is fixedly mounted an objective 12 at the center between the discs 5, 6 and 8, 9 which are arranged symmetrically from a central plane 11. The focal point of the objective 12 is located upon a circumferential point 13 of the outer cylinder 7. Upon the diameter 14, at which there is located a circumferential point 13 and the objective 12, there is arranged opposite the point 13, at least externally of the inner cylinder 4, an advantageously point-shaped light source 15. Between this light source 15 and the inner cylinder 4 there can be arranged, likewise upon the diameter 14, a collecting lens 16. Between the light source 15 and the circumferential point 17, where the diameter 14 intersects the inner cylinder 4, there is arranged a diaphragm 18 having a slotted opening 18' which is disposed perpendicular to the central plane 11.

Both of the discs 5 and 6 of the inner cylinder 4 engage with at least two preferably elastic rolls or rollers 19 arranged at the side of the light source 15 and the circumferential point 17. Such engagement is accomplished in a manner that the rolls 19 rotate with the cylinder 4 free of slip. In similar manner both of the discs 8 and 9 of the outer cylinder 7 engage in a slip-free manner with the rolls or rollers 20, and the rolls 20 are arranged at the side of the circumferential point 13, and thus, are located opposite the rolls 19. Advantageously, at least the rolls 20 are rigidly connected for rotation with one another, for instance by a belt 21 or equivalent drive structure, in a manner such that the outer cylinder 7, as well as the inner cylinder 4 which can be fixedly coupled with the outer cylinder 7, can be placed into rotation by means of the rolls 20 and the belt 21 which in known manner can be operatively coupled with a not particularly illustrated but conventional drive motor.

If in such type apparatus an image carrier 22, for instance a film, is placed between the inner cylinder 4 and the rolls 19, and a copy carrier 23, for instance a light-sensitive paper, is placed between the outer cylinder 7 and the rolls 20 and the belt 21, then such advantageously strip-like carrier elements 22 and 23 travel in opposite sense through the housing 1, if both of the cylinders 4 and 7 are rotated in the same rotational sense. The drawing-in and throughput speed of both carrier strips 22 and 23 are thus directly dependent upon the cylinder diameter and act relative to one another in direct proportion thereto. The angular velocity of both carrier strips 22 and 23 is however identical, yet both of the cylinders 4 and 7 rotate synchronously about the common axis or shaft 10, and upon the respective circumference 24 and 25 of such cylinders 4 and 7 there move free of slip the carrier strips 22 and 23.

If during the rotation of both cylinders 4 and 7, and thus, during the travel of both carrier strips 22 and 23 through the apparatus, the light source 15 is turned-on, then the latter projects the image or picture located upon the transparent image carrier 22, as a function of the strip-shaped diaphragm 18, continuously in a strip-shaped manner on to the copy or copier carrier 23. The ratio between the diameters of both cylinders 4 and 7 corresponds to the manification ratio or factor of the copy in relation to the image or picture.

A person skilled in the art will easily recognize that with such inventive apparatus it is possible to realise a copying method wherein during the entire copying operation, during which a random large number of individual negatives can be copied from the image carrier 22 constructed as a film strip-roll on to the copy carrier 23 constructed as a photo paper strip, no parts of the copier equipment need be accelerated or braked, with the exception of the initial acceleration at the start of the copying work and the stop braking at the end of such work. The copying speed is therefore practically no longer mechanically limited and wear of the equipment practically no longer arises in contrast to most of the prior art copiers.

Advantageously, the heretofore described apparatus additionally is provided with a screen or cover 26 which screens the copy carrier 23 with the exception of a slot at the region of the circumferential point 13. The screen 26 limits a beam channel 27 in which, as needed, there can be arranged additional diaphragm means 28. Additionally, the light source 15 is advantageously mounted within a box or cabinet 29 which is light impervious with respect to the interior of the housing 1 with the exception of the diaphragm opening 18'. Within a box or cabinet 29 or externally thereof there are mounted between the diaphragm 18 and the inner cylinder 4 in known manner filters, diaphragms and the like which can be introduced into the light beam 30. This arrangement however does not constitute subject matter of the present invention, so that it is unnecessary to go into further details thereof nor as to the drive for both of the cylinders 4 and 7. These elements may be considered to be part of the state of the art and a person skilled in the art will be readily capable of incorporating the same, as required, into the inventive apparatus.

The discs 8 and 9 which form the outer cylinder 7 can advantageously be mounted centrally, for instance by means of two ball bearings 31 and 32, upon pins 33 and 34 connected with the base plate 3 and the cover member 2, respectively. Equally the discs 5 and 6 of the inner cylinder 4 can be mounted by means of ball bearings 35 and 36 upon the pins 33 and 34 if they are not formed of one-piece with the discs 8 and 9 of the outer cylinder 7.

With a bipartite design of the mutually operatively associated discs 5 and 8 and 6 and 9 of the two cylinders 4 and 7 such components are designed to be fixedly connectable with one another by conventional coupling means, in order to render possible the previously described synchronized movement of both of the cylinders 4 and 7.

The two-part or bipartite construction, in relation to the one-part construction, affords the advantage that, for instance, by means of the rolls 19 driven by a separate not particularly shown belt, the inner cylinder 4 can be rotated independently of the outer cylinder 7 and vice versa, in other words, both can be individually turned in relation to one another, so that both the image carrier 22 and also the copy carrier 23 can be individually rotatable and thus adjustable, especially prior to start of a longer copying operation, for instance after inserting a film strip between the inner cylinder 4 and the rolls 19 or, as the case may be, a paper strip between the outer cylinder 7 and the rolls 20.

It should be apparent that within or externally of the housing 1 there can be provided conventional guide means both for the image carrier 22 and also the copy carrier 23, in order to be able to guide such in their correct positions upon the cylinders 4 and 7, and specifically, their respective cylinder circumference 24 and 25. As best seen by referring to FIG. 2, the cylinder circumferences 24 and 25 are constructed such that the carrier strips 22 and 23 bear thereon at their edges and are pressed there again by the rolls or rollers 19 and 20 as well as the belt or belts 21, in order to rotate free of slip along with the cylinders 4 and 7.

It will be readily apparent to one skilled in the art that the described schematically illustrated inventive apparatus can carry at its center, instead of a single lens, an entire lens system serving as the objective 12, and its attachment at the stationary pins 33 and 34 can be accomplished in conventional manner. It should also be readily evident that the distance between the disc pairs 5, 6 and 8, 9 corresponding to the image carrier dimensions and the dimensions of the copies, governed by the relationship of the cylinder diameter and the thus determined copy carrier dimensions, should be accommodated as exactly as possible to one another, in order to be able to guide free of play both of the carrier strips 22 and 23 upon the cylinders 4 and 7.

By exchanging the image carrier 22 and the copy carrier 23 in the described apparatus and arranging the cabinet 29 with the light source 15 externally of the outer cylinder 7 and its circumferential point 13, the images or pictures located upon the image carrier 22 can be copied on a reduced scale upon the copy carrier 23 by an amount corresponding to a factor which is proportional to the relationship of the cylinder diameter.

The described embodiment of inventive apparatus has only been given by way of example and not limitation. It should be expressly understood that the equipment can also be designed in a linear construction, so that the carrier strips 22 and 23 travel upon straight or linear paths in opposite directions of travel. The radii of the cylinder segments 24, 25 are then infinite and the spacing of the carrier strips 22, 23 from the optical center of the objective 12 governs the magnification or size reduction of the copy in relation to the original.

The detailed construction of the inventive apparatus according to the heretofore described principle constructional embodiment shown in the drawings will be readily capable of being carried out by one skilled in the art. Equally, its adaption into an automatic copier system or line likewise can be readily perfected by one skilled in the art. Therefore, no further discussion of such features is here believed to be necessary or warranted.

The advantages of the inventive method for copying pictures or images from a transparent image carrier on to a light-sensitive copy carrier as well as the inventive apparatus for the performance thereof will readily be apparent and evident from the foregoing detailed description. It is however to be expressly mentioned that these advantages are not exclusively limited to the continuous extremely high operating and copying speed with minimum wear and the smallest expenditure in control equipment, rather also manifests itself by virtue of the quality of the copies which can be produced with the inventive apparatus. This is so because there is practically completely eliminated any distortion of the image in the direction of travel of the carrier strips 22 and 23 which is optically governed by the strip-like projection of the negative, since in this direction there is only used the central portion of the objective 12. Due to the fixed relative position between the objective, film and paper it is additionally possible to avoid all contrast or image sharpness adjustment errors. Due to the elimination of all linear or angularly accelerated mechanical parts, even after longer periods of use of the inventive apparatus, there are not required any adjustment and readjustment work. Any parts which possibly have to be replaced, such as the light source 15 and the rolls or rollers 19 and 20 and the belt or belts 21 can be simply dismantled and again reassembled due to the simple mechanical construction.

While there are shown and described present preferred embodiments of the invention, it is to be distinctly understood that the invention is not limited thereto, but may be otherwise variously embodied and practiced within the scope of the following claims.

What I claim is:

1. A method of copying images from a transparent image carrier on to a light-sensitive copy carrier, comprising the steps of:

projecting a light beam emanating from a light source through the transparent image carrier and through an objective onto the light-sensitive copy carrier located at a focal point of the objective;

both the part of the image carrier and also the part of the copy carrier which are impinged by the light beam during the copying operation being located upon co-axial cylinder segments and being moved;

the objective being stationarily arranged at a common axis of the cylinder segments;

both the image carrier and the copy carrier being rotated in the same rotational sense at a continuous and constant angular velocity upon axial oppositely located ones of the cylinder segments but being guided in opposite directions continuously through the light beam such that the relationship between the radii of the cylinder segments corresponds to the magnification or size reduction ratio, respectively, of the copy upon the copy carrier in relation to the image at the image carrier; and said image carrier and said copy carrier intersecting the light beam which is covered into a strip-shaped configuration at a common diameter extending through the axis of the cylinder segments.

2. The method as defined in claim 1, further including the steps of:

pressing the image carrier and copy carrier by rolls against the cylinder segments.

3. The method as defined in claim 1, further including the steps of:

moving both the image carrier and the copy carrier upon cylinder segments having infinite radii; and determining the magnification and size reduction ratio of the copy by the relationship of the spacing of the image carrier and copy carrier from the objective arranged therebetween.

4. The method as defined in claim 1, further including the steps of:

forming the cylinder segments by means of a plurality of rollers.

5. The method as defined in claim 2, further including the steps of:

driving said rolls.

6. An apparatus for copying images from a transparent image carrier on to a light-sensitive copy carrier, comprising:

two substantially co-axial cylinders defining inner and outer cylinders;

means defining a common axis of rotation for said two co-axial cylinders;

an objective located at said axis of rotation;

said two co-axial cylinders having cylinder segments;

said image carrier and said copy carrier at least partially bearing upon said cylinder segments;

means for rotating both of said cylinders;

a light source arranged such that it emits a light beam which is projected through the image carrier and the objective onto the copy carrier;

means for fixedly rotationally coupling both of the co-axial cylinders during the copying operation so as to have essentially the same rotational speed;

means for transporting the image carrier free of slip upon one of the cylinders over a predetermined cylinder segment and the copy carrier free of slip upon the other cylinder over a predetermined cylinder segment;

said objective having an optical axis located at the center of the cylinders;

said optical axis of the objective located at the center of the cylinders essentially coinciding with a diameter of said cylinders; and means for rendering said cylinders essentially slot-shaped transparent along said cylinder diameter independent of the rotational positions of said cylinders in a manner such that the light beam at such diameter can permanently fall through the inner cylinder onto the cylinder segment of the outer cylinder.

7. The apparatus as defined in claim 6, wherein:

both of the cylinders are formed of two single-part disc pairs and are mounted substantially centrally at said common axis; and means for fixedly coupling together both of said disc pairs.

8. The apparatus as defined in claim 6, wherein:

said means rendering said cylinders essentially slot-shaped transparent includes a slotted diaphragm means arranged between the light source and the image carrier.

* * * * *